UNITED STATES PATENT OFFICE.

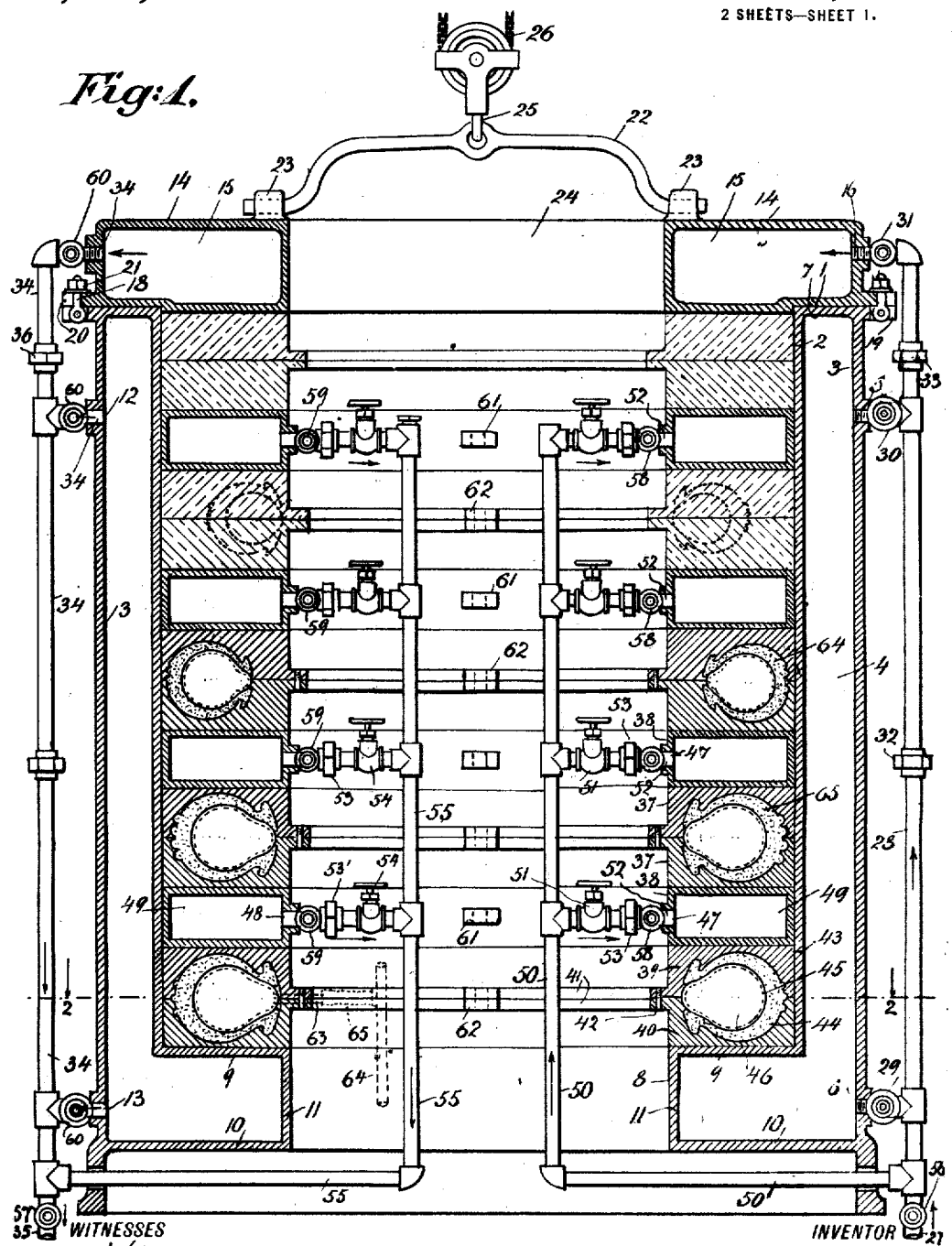

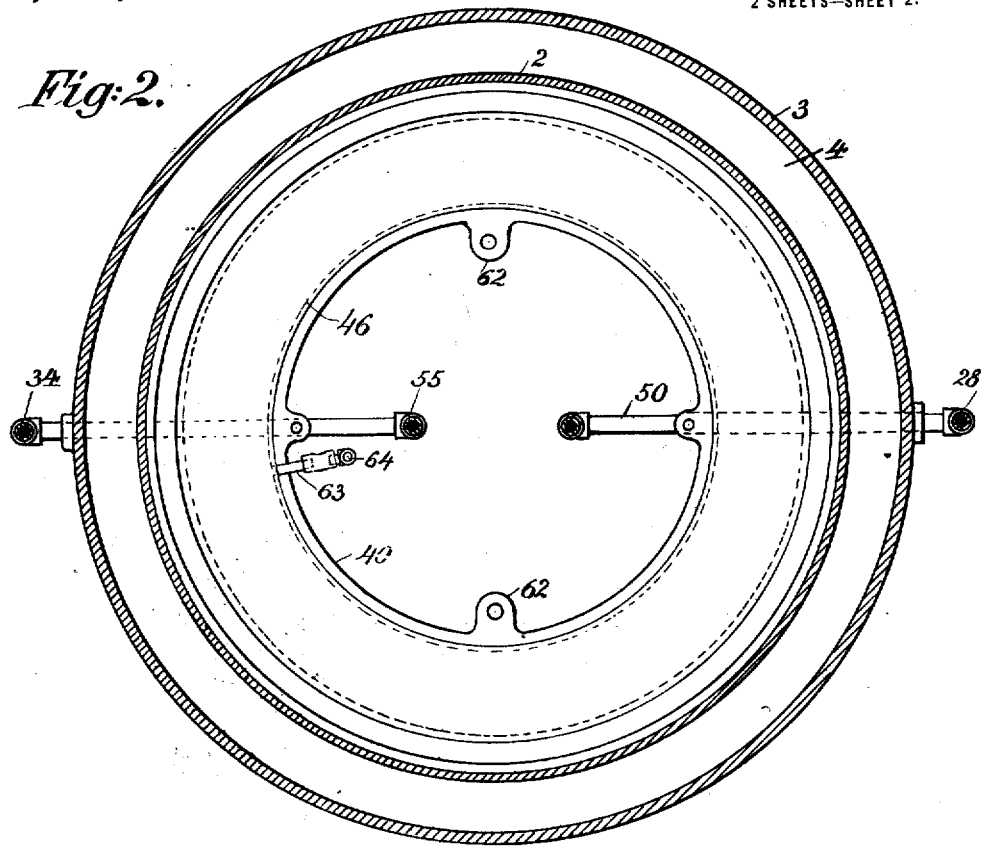
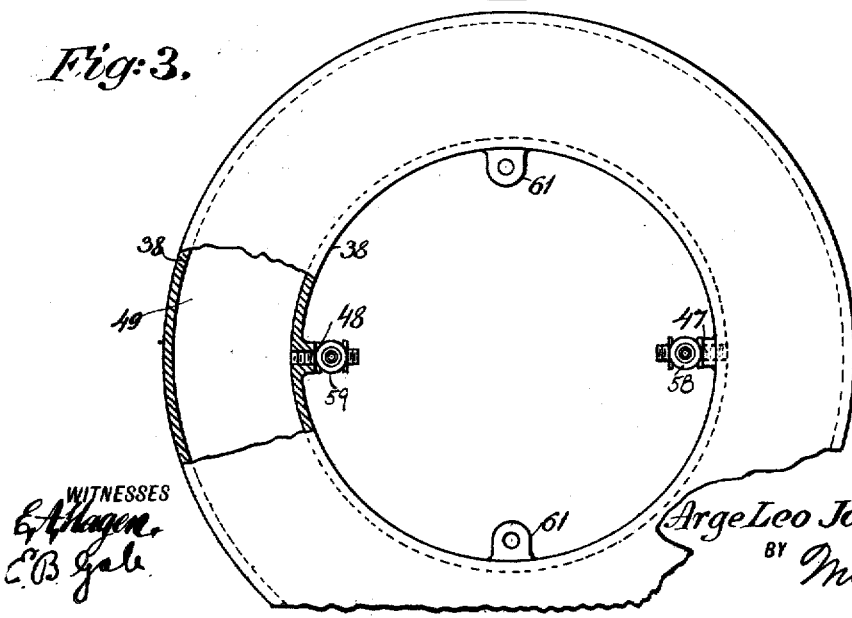

ARGE LEO JACOBSON, OF NEW YORK, N. Y., ASSIGNOR TO LEO A. KEARNEY, OF NEW YORK, N. Y.

TIRE-VULCANIZING APPARATUS.

1,380,966. Specification of Letters Patent. Patented June 7, 1921.

Application filed July 19, 1919, Serial No. 312,029. Renewed December 20, 1920. Serial No. 432,137.

*To all whom it may concern:*

Be it known that I, ARGE LEO JACOBSON, a citizen of the United States, and a resident of the city of New York, borough of Manhattan, in the county and State of New York, have invented a new and Improved Tire-Vulcanizing Apparatus, of which the following is a full, clear, and exact description.

This invention relates generally to vulcanizing apparatus, and more particularly to a device for vulcanizing tires.

Heretofore in the process of vulcanizing the rubber tread on tires, when a number of tires were simultaneously treated, it has been the common practice to provide a closed receptacle in which the molds having the tires therein were placed, and then to subject the tires to a suitable heating process by carrying steam within the receptacle. This has been objectionable because the tire is directly exposed to the steam and causes a relatively large percentage of the tires are damaged, and such tires can only be sold as "seconds."

One of the objects of this invention is to provide an apparatus and a method of vulcanizing which will overcome the objectionable features of the prior practice, by providing an apparatus which will permit the tires to be properly treated without any portion of the mold or tire coming in direct contact with the moisture.

A further object of this invention is to provide a device which will permit a number of tires of the same or different sizes to be simultaneously vulcanized by a dry heat.

A further object of this invention is to provide an improved construction and arrangement of parts of the vulcanizing apparatus which will permit heat to be conducted directly through the walls of a heat-carrying medium to the tire and to be effectively and uniformly distributed thereto without having to pass through air or vacuum spaces.

A further object of this invention is to provide a construction in which the tire is sealed, and which will effectively carry heat only to those parts of the tire which require the same in the curing process.

The above objects are accomplished by providing a steam-jacketed receptacle in which the tire molds are placed so that the periphery thereof will be in contact with the inner wall of the receptacle so that the heat from the jacketed receptacle will be conducted directly through the walls of the receptacle and mold to the tire, and by inserting a heating means between the molds, which furnish the heat for uniformly and effectively vulcanizing the side portions of the tire. In the preferred form the means interposed between the molds comprises a hollow member having a steam connection therewith.

Other objects and advantages will be apparent from the following description and the accompanying drawings in which similar characters of reference designate like parts in the several views.

In the drawings showing one of the preferred forms of this invention

Figure 1 is a sectional elevational view showing the relative position of the device with a number of tires therein;

Fig. 2 is a sectional view looking in the direction of the arrows and taken on the line 2—2 of Fig. 1;

Fig. 3 is a plan view partly in section showing one of the heating members.

In the drawings, the invention is shown as comprising a cylindrical receptacle 1, having an inner wall 2 and an outer wall 3, forming an annular chamber 4 therebetween into which steam, preferably superheated, is introduced, through inlet passages 5, 6 located in the preferred form one at the top and the other at the bottom, respectively. The walls 2, 3 of the receptacle are connected at the top edges and the chamber 4 is closed by an annular web 7. At the bottom of the receptacle 1, the annular chamber 4 communicates with another annular chamber 8, having an upper wall 9 and a lower wall 10, preferably integral with the walls 2 and 3, respectively, of the receptacle. The inner edges of the walls 9, 10 are connected by a cylindrical wall 11. Suitable outlet ports 12 and 13 are connected to the opposite side of the wall 3 from the inlet passages 5, 6.

A suitable cover 14 annular in form, is provided, having an annular chamber 15. A steam inlet 16 connected in the cover 14 at one side of the chamber 15, is provided, and an outlet 17 connected in the opposite side of the cover 14 and communicating with the chamber 15 is also provided. The cover 14 and the receptacle 1 are held in proper relative position by means of bolts 18, having one end thereof pivotally connected to a lug 19 integral with the receptacle, there being provided integral with the lower edge of the cover another lug 20 slotted to receive the bolt 18. The end of the bolt 18 is threaded to receive a nut 21. In order to remove the cover 14 from the receptacle 1, a bar handle 22 is provided having the ends thereof held in lugs 23 fixed to the cover 14 on opposite sides of the circular opening 24 in the center thereof. Any suitable hoisting means, such as a hook 25, carried by a pulley 26 of a block-and-fall system, may be provided to raise the cover 14 from the receptacle 1. It is thus seen that the annular chamber 4 extends around the receptacle 1, and the lower annular chamber 8 communicating therewith, together with the annular chamber 15 of the cover, serve when supplied with a steam, preferably superheated, to effectively heat the cylindrical chamber within the receptacle. A main steam supply pipe 27 connects with a supply pipe 28 which extends upwardly and adjacent to the inlet passages 6 and 6 of the receptacle and the inlet 16 of the cover 14, through valves 29, 30 and 31, respectively. A coupling 32 is connected in the supply pipe 28 between the valves 29 and 30, and another coupling 33 is connected between the valves 30 and 31, said couplings serving to facilitate the connecting of the various pipe sections. The outlets 12 and 13 for the chamber 4 of the receptacle 1, and the outlet 17 for the chamber 15 of the cover 14, are connected by suitable pipe connection 34 to a return pipe 35. A coupling 36 is connected in the upper end of the pipe 34 between the outlet 17 of the cover and the upper outlet 12 of the chamber 4. The couplings 33 and 36, of course, will have to be disconnected in order to permit the cover 14 to be removed from the receptacle.

One of the essential features in the construction and arrangement of the various parts of the vulcanizing apparatus, is the provision of alternate tire molds 37 and a heating member or means 38. In the form shown, the tire mold comprises two solid sections 39 and 40, each section having a flange 41 thereon, through which passes a bolt 42 or other means for holding the said sections in proper relative position. The outer periphery 43 of the mold comes in direct contact with the inner wall 2 of the steam jacketed receptacle. Each section of the mold is shaped to conform with the outer surface of a tire 45 positioned therein. An air bag 46 is preferably provided to form a core for the fabric portion of the shoe positioned within the mold, to hold the fabric and rubber tread of the tire in proper relative position during the vulcanizing process. The valve connection to the air core 46 is not shown, such a construction being well known in the art. In the preferred form shown, the heating member is shown as comprising a hollow annular shaped ring having an inlet 47 and an outlet 48 communicating with a chamber 49 formed within the ring. Steam, preferably superheated, is carried to the chamber 49 from the steam supply pipe 27, through piping 50, valve 51, and piping 52, a coupling 53 being connected in the pipe 52 between the inlet 47 and the valve 51. The steam heated ring 38 being positioned between the tire molds 37, effectively supplies heat to the sides of the tires through the tire molds. An important feature in the construction shown is that the heat is directly transmitted to the tire within the mold on the sides and the periphery of the tire directly from the heated ring and the wall of the chamber through the metal of the mold, without first having to pass through air chambers of any kind. The outlets 48 of the heating rings 38 are connected to the return supply pipe 35 through a piping connection 53, valve 54, and piping 55.

In order to shut off the steam supplied to the receptacle 1, and the heating rings 38, a valve 56 may be provided in the main steam supply pipe 27. If desired, another valve 57 may be provided for the steam outlet pipe 35, to be closed in order to prevent a back pressure of steam when the various sections of the pipes are uncoupled at the time the tire molds and heating rings are removed from the receptacle.

With reference to the pipe valve and coupling connections to the heating rings, preferably valves 58 and 59 are located in the pipe connection extending from the inlet 47 and the outlet 48, respectively, of the heating ring, the said valves being positioned between the said inlet and outlet and the couplings 53 and 53'. The valve 51 at the inner side of the heating ring and located at the other side of the coupling 53, would be needed, in addition to the valve 58, so that the steam supply could be cut off. By providing the valves 58 and 59 directly in the inlet and outlet pipe connection, the said valves may be closed previous to the removal of the heating ring 38 from the receptacle, and in this way prevent the escape of the steam already within the ring. By providing a valve on each side of the coupling, the escape of steam is prevented. It is understood, however, that the invention is not to be limited to the valve arrangement herein shown. For the reasons above noted, the valves 31 and 60 are placed between the couplings 33 and 36, and the inlet 16 and the exhaust port 17, respectively, of the removable cover.

The heating rings 38 are provided with lugs 61 located on opposite sides, so that a hoisting means may engage therewith for facilitating the removal of the rings from the receptacle. The mold sections are provided with similar lugs 62 for the same purpose.

In order to insure a proper positioning of the fabric and tread with respect to the mold, and any non-skid design embodied therein, the air bag body 46 is provided with a valve stem 63, which receives air under pressure from a supply pipe 64. A detachable pipe connection 65 is made between the valve stem 63 and the supply pipe 64. Particular note is herein to be made of the fact that an air bag is provided for each one of the tire molds which may contain tires of the same or different sizes, and it is to be further noted that the tires are sealed within the molds.

Heretofore it has been common practice in the manufacture of tires to put a number of tire molds having tires therein of the same size, within a receptacle, placing one upon the other upon a descending plunger. When the desired number of tires have been stacked within the receptacle, a cover is placed on the top, and a supply of steam is directed inside of the receptacle. The tire molds used under such conditions are made in sections, and a metal core is positioned inside of the tire between the mold sections. When the mold is first placed within the receptacle, the mold sections are separated a certain distance, so that when the supply of steam is turned on, a portion of the tire comes in direct contact therewith. The plunger under pressure is then pushed upward and presses the core sections together after the rubber stock within the mold is heated, thus forcing the stock within the non-skid design of the mold and in close contact with the fabric. When the rubber stock has been forced into the proper position, the sections of the tire mold come together, but it often happens that the molds become displaced and cause imperfect vulcanizing of the tire.

The present method of vulcanizing overcomes the above objections by providing a method whereby a number of tires of different sizes may be simultaneously cured or vulcanized in a common receptacle by a relatively dry heat. This is accomplished by providing a plurality of sectional molds, the outside diameter of each of which is substantially the same, so that the molds even though they contain differently sized tires, will fit snugly within the receptacle. Heating rings are provided which are interposed between adjacent tire molds to heat the sides thereof. An air bag core is provided for each of the tire molds so that at all times a relatively constant pressure is exerted from inside of the fabric which tends to press the rubber stock in the design within the tire mold and in contact with the fabric. It is thus seen that the sections of the tire mold are brought tightly together and form substantially a seal for the tire mold and the air bag core therein. The sections of the tire mold are solid metal, and thus effectively conduct the heat from the side wall of the receptacle with which they are closely associated. Heat is also conducted from the heating rings through the metal mold to the sides of the tire. It is to be noted that at no time does any part of the tire mold come in direct contact with the steam.

All of the tire molds have the same outside diameter irrespective of the size of the tires in the different molds. Of course in such a mold construction, the distance between the inner wall of the receptacle and the tread of the tire will vary with the different sizes of tires. However, the increased thickness of the tire mold between the tread of the tire and the periphery of the mold on the smaller size tires will not be enough to prevent the heat from being effectively carried to the tire. A small size tire 63 is shown in the tire mold which is the second one from the top, and the other tire 64, 65 of different sizes are shown in the molds below.

It is to be understood that while the outside diameters of the tire molds are the same, they are of such a size as will permit a snug fit between the periphery thereof and the wall of the heating receptacle. A certain clearance will be left between the mold and the wall, but only enough to permit the mold to be moved in and out of the receptacle. Such a clearance space will not interfere with the effective heating of the mold.

In operation, a tire mold will first have the tire and air bag core placed therein, and the mold then tightly closed. A tire mold will be placed in the bottom of the receptacle, and a heating ring placed thereon, and other tire molds and heating rings will alternately be arranged within the receptacle. The necessary piping connections will be made with the inlet and outlet passages of the heating ring, and a connection will be made with the stem of the air valves. Of course after the last tire mold has been placed within the receptacle, the cover will be properly positioned and the proper steam connections made with the inlet and outlet connections of the chamber therein. The temperature and pressure maintained in the chambers of the rings and the receptacle, and the length of time for which they are maintained, will depend upon the particular qualities of the rubber to be vulcanized.

The vulcanizing device and method of operation may be used either in the manufacture of new tires, or in the repair or rebuilding of old tires by applying new rubber stock to the carcass or fabric of the shoe.

While there has been shown herein one of the preferred forms of the invention, it is understood that certain changes and modifications may be made without departing from the spirit and scope of this invention.

Having thus described my invention, what I claim is:

1. In a device of the character described, the combination of a steam jacketed receptacle, a plurality of molds therein, and a heating means interposed between adjacent molds.

2. A tire vulcanizing device comprising a steam jacketed receptacle, molds therein having the outer surface thereof in contact with the inner surface of the receptacle, and heating rings between the molds.

3. A tire vulcanizing apparatus comprising in combination, a cylindrical receptacle, means for heating said receptacle, tire molds having the periphery thereof in contact with the inner wall of the receptacle, and heating rings arranged between adjacent molds.

4. A tire vulcanizing device comprising in combination, a receptacle having a hollow annular chamber therein, a steam inlet and outlet in communication with said chamber, a cylindrical chamber within said receptacle, annular tire molds adapted to be positioned within said cylindrical chamber so that the outer periphery of the molds will be in contact with the inner wall of said annular chamber, hollow rings interposed between the tire molds, and a steam inlet and outlet connection for each of said rings.

5. In a tire vulcanizing device comprising a steam jacketed receptacle, a plurality of tire molds within said receptacle and having the outer periphery thereof in contact with the inner wall of the steam jacketed receptacle, and means for supplying a relatively dry heat to the sides of said tire molds, said means including a hollow ring and a steam inlet and outlet connection therefor.

6. A tire vulcanizing device comprising in combination, a receptacle having a chamber in the walls thereof, means for heating the said chamber, a plurality of tire molds having tires therein of different sizes arranged within said receptacle, and an independent heating means interposed between adjacent tire molds.

7. A tire vulcanizing device comprising a cylindrical receptacle having an annular heating chamber in the sides thereof, and another annular heating chamber at the bottom thereof in communication with the first-mentioned annular chamber, a plurality of sectional tire molds adapted to receive different size tires, arranged within the receptacle, each of said tire molds having the same outside diameter, and an independent heating means including a steam heated ring interposed between adjacent tire molds.

8. A tire vulcanizing device comprising in combination, a steam jacketed receptacle, a plurality of tire molds adapted to receive different size tires, the said tire molds having substantially the same outside diameter and substantially the same inside diameter, and a steam heated ring interposed between adjacent tire molds.

9. In a tire vulcanizing apparatus, the combination of a steam jacketed receptacle open at the top and having an annular chamber in the bottom thereof, an annular cover therefor having an annular chamber therein, inlet and outlet passages for said chambers, a plurality of sealed tire molds adapted to receive different size tires, arranged within the receptacle, and a heating means including a steam heated ring interposed between adjacent tire molds.

10. In a tire vulcanizing apparatus, the combination of a steam jacketed receptacle open at the top and having an annular chamber in the bottom thereof, an annular cover therefor having an annular chamber therein, inlet and outlet passages for said chambers, a plurality of sealed tire molds adapted to receive different size tires arranged within the receptacle, a heating means including a steam heated ring, interposed between adjacent tire molds and an air bag core for each of said tire molds, and means connected therewith for maintaining a relatively constant air pressure within each of the tire molds throughout the vulcanizing operation, whereby a dry heat is supplied to each of the tires during the vulcanizing operation.

11. In a vulcanizing apparatus, means to permit a plurality of tires of different sizes to be simultaneously treated within a common receptacle by a dry heat, said means including a steam jacketed receptacle, a plurality of sealed tire molds of the same size adapted to receive tires of different sizes, each of said tire molds having a tire, and an air bag core therein, annular members having a steam heated chamber therein interposed between adjacent tire molds, means connected with the air bag cores for maintaining a relatively constant pressure therein throughout the vulcanizing operation, and means connected with the annular members for maintaining a relatively constant temperature therein throughout the vulcanizing operation.

ARGE LEO JACOBSON.